United States Patent
Selby

(10) Patent No.: US 9,924,726 B2
(45) Date of Patent: Mar. 27, 2018

(54) METHODS AND PACKAGING FOR WET AGING MEAT

(71) Applicant: LUND FOOD HOLDINGS, INC., Edina, MN (US)

(72) Inventor: Michael Christopher Selby, Forest Lake, MN (US)

(73) Assignee: LUND FOOD HOLDINGS, INC., Edina, MN (US)

(*) Notice: Subject to any disclaimer, the term of this patent is extended or adjusted under 35 U.S.C. 154(b) by 0 days.

(21) Appl. No.: 15/425,794

(22) Filed: Feb. 6, 2017

(65) Prior Publication Data
US 2017/0142990 A1    May 25, 2017

Related U.S. Application Data

(62) Division of application No. 14/334,633, filed on Jul. 17, 2014.

(51) Int. Cl.
*A23B 4/027* (2006.01)
*A23L 3/00* (2006.01)
*A23L 13/00* (2016.01)

(52) U.S. Cl.
CPC .............. *A23B 4/027* (2013.01); *A23L 13/03* (2016.08); *A23V 2002/00* (2013.01)

(58) Field of Classification Search
CPC .. A23B 4/027; A23B 4/00; A23B 4/02; A23B 4/021; A23B 4/023; A23B 4/0235; A23B 4/10; A23B 4/14; A23B 4/18; A23L 13/03; A23L 13/00; A23L 13/70; A23L 13/72; A23L 13/74; A23L 13/76;
(Continued)

(56) References Cited

U.S. PATENT DOCUMENTS

| | | | |
|---|---|---|---|
| 2,242,300 | A | 5/1941 | Hartanov |
| 2,776,216 | A | 1/1957 | Thomas |

(Continued)

FOREIGN PATENT DOCUMENTS

| | | | |
|---|---|---|---|
| JP | 2001253502 A | | 9/2001 |
| JP | 2005192453 A | | 7/2005 |
| KR | 20050019586 A | * | 3/2005 |

OTHER PUBLICATIONS

Mondal et al., Removal of mercury (II) from aqueous solution using bamboo leaf powder: equilibrium, thermodynamic and kinetic studies. Dec. 2013. Retrieved from: <https://www.researchgate.net/publication/259173316_Removal_of_mercury_II_from_aqueous_solution_using_bamboo_leaf_powder_Equilibrium_thermodynamic_and_kinetic_studies>.*

(Continued)

*Primary Examiner* — Erik Kashnikow
*Assistant Examiner* — Ashley Axtell
(74) *Attorney, Agent, or Firm* — Hogan Lovells US LLP

(57) ABSTRACT

Methods, packaging, and packets for wet aging meat are described herein. For example, in one or more embodiments of the present disclosure a package for wet aging meat includes a cut of meat having a fat layer portion and an edible meat portion, an adsorptive material to adsorb gases emitted from the cut of meat wherein the adsorptive material is positioned on the fat layer portion, a salt material positioned on the adsorptive material or on the fat layer portion with the adsorptive material, and wherein the cut of meat with the adsorptive material and salt material is sealed in a packaging material to form the package.

8 Claims, 9 Drawing Sheets

(58) Field of Classification Search
CPC . A23L 3/00; A23L 3/34; A23L 3/3454; A23V 2200/00; A23V 2200/10; A23V 2200/046; A23V 2200/02; B65D 81/24–81/268; B65D 85/00; B65D 25/06; B65D 25/062; B65D 25/064; B65D 25/065; B65D 25/067
USPC ....... 426/332, 315, 316, 398, 392, 395, 410, 426/415, 106–129, 321–326, 132, 133, 426/641, 642, 644, 645; 205/205; 206/204, 0.5
See application file for complete search history.

(56) References Cited

U.S. PATENT DOCUMENTS

| | | | |
|---|---|---|---|
| 2,828,212 A | 3/1958 | Sair | |
| 3,147,123 A | 9/1964 | Komarik | |
| 4,540,616 A | 9/1985 | Gilmore | |
| 4,845,958 A | 7/1989 | Senda et al. | |
| 5,470,597 A | 11/1995 | Mendenhall | |
| 5,472,722 A | 12/1995 | Burger | |
| 6,623,773 B2 | 9/2003 | Meier et al. | |
| 7,998,517 B2 | 8/2011 | Burke | |
| 2005/0271783 A1 | 12/2005 | Digges | |
| 2008/0003336 A1 | 1/2008 | Schafer | |
| 2008/0138478 A1 | 6/2008 | Ebner | |
| 2010/0068348 A1 | 3/2010 | Cundith | |
| 2014/0037829 A1 | 2/2014 | Lobel | |
| 2015/0093478 A1* | 4/2015 | Versteylen | A01N 25/34 426/124 |
| 2016/0058021 A1* | 3/2016 | Schmidt | B01D 53/0407 426/332 |

OTHER PUBLICATIONS

How to Wet Age a Brisket. How to BBQ right.com, Aug. 8, 2013. Retrieved from <http://howtobbgright.com/blog/?p=1770>.*
Beef Glossary and Beef Cut Diagram. The Nibble. Mar. 27, 2008. Retrieved from: <https://web.archive.org/web/20080327185500/https://www.thenibble.com/REVIEWS/main/meats/beef/glossary5.asp>.*
Mandy Major. 8 Things Your Butcher Wants to Tell You. Woman's Day. Jul. 26, 2011. Retrieved from: <http://www.womansday.com/food-recipes/cooking-tips/tips/a5780/8-things-your-butcher-wants-to-tell-you-119930/>.*
KR 20050019586A Espacenet Translation.*
Naka et al. Adsorption Effect of Activated Charcoal on Enterohemorrhagic *Escherichia coli*. 2001. J. Vet. Med. Sci. 63(3): 281-285. Retrieved from: <https://www.jstage.jst.go.jp/article/jvms/63/3/63_3_281/_pdf>.*
McAirlaid's Meat Pads. Dec. 18, 2013. Retrieved from Internet URL: <https://web.archive.org/web/20131218200705/http://www.meatpads.info/en/>.*
Salting Meat: Cook's Illustrated. Nov. 2010. Retrieved from Internet URL: <https://www.cooksillustrated.com/how_tos/5681-salting-meat>.*
Brining: Everything You Need to Know (and Then Some). Huffpost Taste. Nov. 17, 2011. Retrieved from Internet URL: < https://web.archive.org/web/20121028180241/https://www.huffingtonpost.com/craig-goldwyn/brining-a-turkey_b_1093300.html>.*
Tatonka Dust. peppersandmore.com. Mar. 6, 2014. <http://peppersandmore.com/2014/03/06/tatonka-dust/>.
Charcoal Seasoning. americanspice.com. Aug. 24, 2011. Retrieved from Internet Archive URL: <https://web.archive.org/web/20110824015539//http://www.americanspice.com/charcoal-seasoning/>.
Black Lava. Salty Wahine. Dec. 14, 2012. Retrieved from Internet Archive URL: <https://web.archive.org/web/20121214090742/http://saltywahine.com/black-lava.html>.
Rib Eye Steaks Sous Vide. Free the Animal. Feb. 4, 2010. <http://freetheanimal.com/2010/02/ribeye-steaks-sous-vide.html>.
Salish Alderwood Smoked Salt. Salt Works. Nov. 4, 2011. Retrieved from Internet Archive URL: <https://web.archive.org/web/20111104131008/http://www.saltworks.us/salish-alder-wood-smoked-sea-salt.html>.
Charcoal Salt. Instructables. Jun. 8, 2013. Retrieved from Internet Archive URL: <https://web.archive.org/web/20130613095456/http://www.instructables.com/id/CHARCOAL-SALT>.
Kerry, Joseph. Butler, Paul. Smart Packaging Technologies for Fast Moving Consumer Goods. John Wiley & Sons. 2008. p. 3.
Activated Carbon Definition, 2009. Retrieved from Internet Archive URL: <http://web.archive.org/web/20091122044016/http://www.fao.org/ag/agn/jecfa-additives/specs/Monograph1/Additive-006.pdf>.

* cited by examiner

METHODS AND PACKAGING FOR WET AGING MEAT

CROSS-REFERENCE TO RELATED APPLICATIONS

This application is a divisional of U.S. patent application Ser. No. 14/334,633, filed on Jul. 17, 2014, which is incorporated herein by reference in its entirety.

BACKGROUND OF THE DISCLOSURE

To improve the tenderness and/or flavor of meat, such as beef, the meat can be aged to allow endogenous proteolytic enzymes to weaken structural and myofibrillar proteins. Typically meat is aged through refrigeration at temperatures just above freezing (e.g., 33-34 degrees Fahrenheit). In the aging process, a natural breakdown of the meat occurs during which the muscles at first shorten and stiffen but then become tenderer over time. Chemical changes occurring in the muscle and fat during the aging process can result in meat that is desired because of flavor, aroma, and/or tenderness that develop. Meat can be aged by a wet aging or a dry aging process.

Wet aging of meat is faster and less expensive than dry aging. Wet aging generally includes vacuum packaging meat in a plastic material to seal the meat so that moisture cannot escape from within the package and the meat is surrounded by and absorbs its juices. Wet aging, however, can produce a distinctive taste.

Dry aging of meat, by contrast, is more time consuming than wet aging. Dry aging generally includes leaving the meat exposed to oxygen in a controlled, cold environment, and allowing the meat to breathe. Due to the exposure of the meat to oxygen, the outer portion of the meat can mold or harden and that portion of the meat can be trimmed. Further, over time, the meat can lose weight and shrink. For instance, prior to reaching the store that sells the meat to the consumer, the meat may have lost a third or more of its weight as moisture loss (e.g., shrinkage).

DETAILED DESCRIPTION OF THE DISCLOSURE

Figure 1:
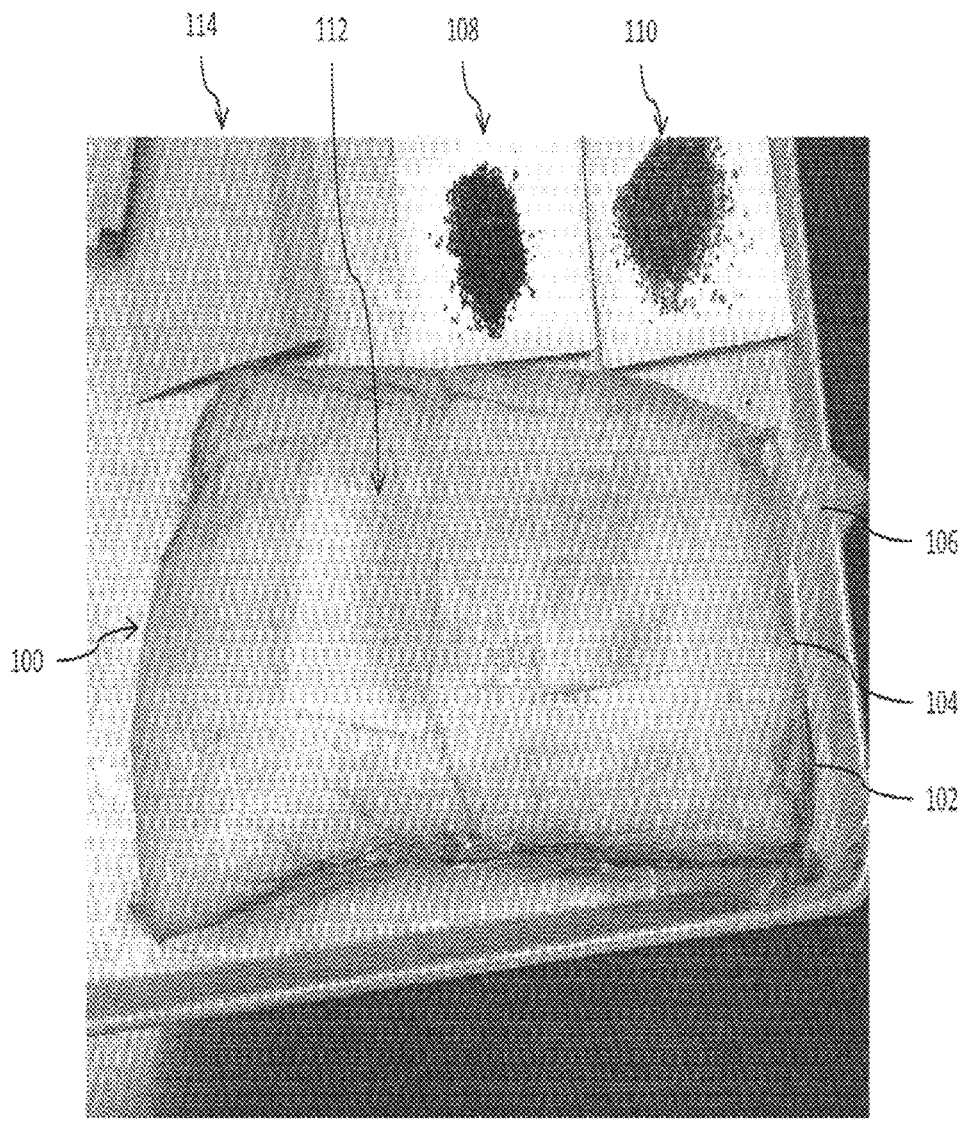
FIG. 1 illustrates an example of a package for wet aging meat in accordance with one or more embodiments of the present disclosure.

Methods, packaging, and packets for wet aging meat are described herein. For example, in one or more embodiments of the present disclosure a package for wet aging meat can include a number of aging materials, such as an adsorptive material and a salt applied on the fat layer of the cut of meat. The adsorptive material is used to collect gases emitted from the cut of meat. The salt acts as an aromatic, but also is used to pull moisture from the cut of meat. The cut of meat with the applied adsorptive material and salt can be hermetically sealed in a packaging material (e.g., vacuum sealed in plastic material) wherein the wet aging process can be accomplished.

Dry aging of meat can be expensive and time consuming as compared to wet aging of meat. For instance, dry aging can include the use of large amounts of space that is temperature controlled for 15-28 days or longer. Further, the resulting cut of meat can lose a third or more of its weight due to moisture loss during the dry aging process.

Wet aging can reduce the loss of meat volume and/or weight, time of aging, and/or cost of aging; however, many consumers prefer the taste of meat that is dry aged compared to meat that is wet aged using traditional wet aging processes. For example, some consumers describe wet aged meat as having a metallic taste.

By contrast, method and package embodiments of the present disclosure for wet aging meat can include a wet aging process that results in lower shrinkage of the meat in volume and weight as compared to dry aging processes and a preferable taste as compared to prior wet aging and/or dry aging processes.

Typically, when a carcass of an animal, such as a cow is cut into parts, it is usually cut into primal cuts of meat, then into subprimal cuts, and finally into fabricated cuts that are sold to consumers. Meat is typically slipped and/or stored in either primal or subprimal cuts. For wet aging processes, it is usually done on primal or subprimal cuts, where that cut still has a fat layer on it that will be removed to make fabricated cuts, such as steaks.

As used herein, when referring to the "meat" or "cut of meat" below, it is meant to refer to a primal or subprimal cut that is to be aged and still includes a fat layer thereon. Also, as used herein, when referring to "meat" or "cut of meat", the cut has two parts, a fat layer portion and an edible meat portion. The edible meat portion is that portion of the cut that remains when the fat layer is removed. However, both the fat layer portion and the edible meat portion are edible.

A fat layer of the cut of meat, as used herein, can include a layer of substantially solid lipid material derived from the animal (e.g., a cow) that is the source of the meat. Thereby, the fat layer can be naturally occurring fat that is on the meat when the animal is butchered.

As discussed herein, in various embodiments, a package can be formed having certain aging materials therein to wet age the meat. In various embodiments, the package can include an adsorptive material and a salt material. The adsorptive material can, for example, be applied directly to a fat layer portion of the cut of meat and the salt can be applied on top of the adsorptive material.

Alternatively, the adsorptive material and salt can be contained in one or more packets (either in separate packets or together in a packet) (e.g., formed from a gas/liquid permeable material, such as cheese clothpacket) that can be applied directly on the fat layer portion of the cut of meat. The cut of meat with one or more packets of the adsorptive material and the salt can be sealed (e.g., hermetically sealed) within the package for wet aging the cut of meat. In various embodiments, a piece of wood paper can be applied on top of the one or more packets and sealed with the cut of meat inside the package.

The adsorptive material can, for instance, collect gases emitted from the cut of meat as it wet ages but does not absorb moisture from the cut of meat. Since the salt is not in direct contact with the cut of meat, some moisture can be pulled out of the meat by the salt (e.g., by osmosis), but not through the entire cut of meat such as with a marinade or curing process.

In various embodiments, a piece of wood paper can be included in the aging materials. The wood paper can be beneficial in several ways. For example, as will be discussed in more detail below, the wood paper can be used: to assist with holding the one or more packets in place, as an aromatic, and/or as a desiccant, among other benefits. Further, by sealing the meat with the adsorptive material, salt, and piece of wood paper to form the package, the wet aging process can occur during transit of the meat from various locations (e.g., along the supply chain) as tight vacuum type sealing of the package can keep the wood paper pressed against the adsorptive material and salt to keep it in place against the layer of fat.

FIG. 1 illustrates an example of a package for wet aging meat in accordance with one or more embodiments of the present disclosure. A package, as used herein, is an enclosure for the wet aging of meat. Example types of meat that could be suitable for use with this process include: beef, venison, bison, elk, lamb, veal, pork, poultry, and/or seafood, among other meats.

In various embodiments, such as that illustrated in FIG. 1, the package 100 can include one or more packets 112 applied on a fat layer portion 104 of the cut of meat. For purposes of showing possible positioning of the packets on the surface of a fat layer portion 104 of a cut of meat, FIG. 1 shows two packets on the outside of the packaging material 106. However, this is only provided in the figure for illustration purpose and it should be noted by the reader that it is intended that these packets be positioned inside the packaging material when practicing the embodiments of the present disclosure (as discussed with respect to FIGS. 2C and 2D).

The one or more packets can be applied to the outer surface of the fat layer of the cut of meat (the inner surface is adjacent to the edible meat portion 102 of the cut of meat) and will not touch any of the edible meat portion 102 of the cut of meat. The one or more packets 112 can be made from a gas/liquid permeable material to allow gases within the package 100 to be collected by the adsorptive material and allow some interaction with the salt therein.

A suitable packet size can be, for example, a 3½ inch square packet, however, any suitable sized packet may be used. For example, the packet may be sized to span the typical size of the cut of meat being packaged (e.g., 5"×10"). In some embodiments, it may be preferable to leave an area around the edges (an inch border around the surface of the fat layer portion 104) of the meat free of aging materials. This can be beneficial in keeping the materials from touching the edible meat portion 102.

As discussed above, the one or more packets 112 can contain an adsorptive material 108 and a salt material 110. In various embodiments, the mixture of the adsorptive material and the salt material in the packet 112 can include an equal composition of the adsorptive material and the salt material (e.g., a 50/50 mixture), for example. A 50/50 mixture can be beneficial in some embodiments to blend the effects to the adsorptive material and the salt material with respect to the aging of the cut of meat.

The adsorptive material, as used herein, can include a substrate and/or a mixture that can adsorb gases emitted from the meat without absorbing moisture from the meat. For instance, the adsorptive material can include an active charcoal. The adsorptive material (e.g., active charcoal) can, for example, include small pores that increase the surface area and allow the charcoal to collect more gases as the meat ages than other types of charcoal, although the present disclosure is not limited to activated charcoal.

Further, it is believed that the adsorptive material 108 on the fat layer portion 104 (e.g., directly on the fat layer portion 104 or in the packet 112 on the fat layer portion 104) can create small pores (e.g., openings) on the fat layer portion 104 of the cut of meat. The pores created on the fat layer portion 104 can allow the salt material 110 to pull some moisture from the cut of meat, but not through the entire cut of meat such as with a marinade or curing process.

An example of an active charcoal can include a derivative of coconut shells, among other forms of carbon. The active charcoal can come in various form factors. For example, the active charcoal can be provided as a coarse grain charcoal. The gases adsorbed can include gases released from the meat during an aging process, for example.

In various embodiments, the adsorptive material 108 can include a mixture of active charcoal and sea salt. The mixture of active charcoal and sea salt can, for example, be used to neutralize the active charcoal (e.g., prevent the active charcoal from being overpowering with respect to the effects of the salt material). In some embodiments, this mix of active charcoal and sea salt can be provided with a separate amount of salt (e.g., 50% active charcoal and sea salt and 50% alder wood salt, as discussed below).

The salt, as used herein, can be any suitable type of salt for providing the benefits discussed herein (e.g., acts as an aromatic, pulling some moisture from the cut of meat, providing some flavoring attributes). An example salt type can include an alder wood salt (e.g., a salt smoked with alder wood). Although examples in accordance with the present disclosure are not so limited and can include any suitable type of salt.

It is believed that the salt material 110 can pull moisture out of the cut of meat and inhibit growth of microorganisms by drawing water out of microbial cells through osmosis. By applying the salt material 110 and the adsorptive material 108 directly to the fat layer portion 104 and/or in the one or more packets 112 applied directly to the fat layer portion 104, moisture is pulled by the salt material 110 (e.g., through the pores on the fat layer 104 that are believed to be created by the adsorptive material 108) and held into place inside the fat layer portion 104.

Locating the packet on the fat layer portion 104 of the cut of meat can, for instance, allow for other benefits of the use of salt. For example, applying the salt material (or a packet containing salt material) directly to the edible meat portion 102 of the cut of meat can result in a curing or marinating effect on the cut of meat, which would not be conducive to the aging process.

Applying the one or more packets and/or mixture directly on the fat layer portion 104 and sealing the cut of meat with the one or more packets 112 and/or mixture for 20-30 days can result in moisture loss from the cut of meat that is less than 2 percent of weight of the meat. By contrast, dry aging processes can result in a third or more of weight loss of the meat (e.g., shrinkage). Further, the moisture lost from the meat is still within the package 100 due to the sealing of the contents (as further discussed herein). And, as discussed herein, gases from the aging meat can be adsorbed by the adsorptive material.

As illustrated by FIG. 1, in a number of embodiments, a piece of wood paper (it could also be multiple pieces in some embodiments) 114 can be applied on top of the one or more packets 112 that are applied on the fat layer portion 104 of the cut of meat. That is, the piece of wood paper can be located on the one or more packets that are located on the fat layer portion 104 of the cut of meat.

As used herein, "wood paper" is a thinly sliced piece of wood (e.g., a thickness of 0.1 mm to 1 mm, for example). The piece of wood paper can be made from various wood types, such as a cedar paper, alder wood paper, hickory paper, oak paper, birch paper, and/or other wood types. The piece of wood paper can provide a number of benefits as discussed above, for example, to hold the packet in place, act as an aromatic, and/or act as a desiccant.

As discussed above, the cut of meat, with the one or more packets 112 and wood paper 114, can be sealed (e.g., hermetically seated) in packaging material 106 to form the package 100 for wet aging the meat. For instance, the cut of meat and the one or more packets 112 can be sealed in a packaging material 106 that is substantially impermeable to air and microorganisms.

The packaging material 106 can include, for instance, a plastic material, although embodiments in accordance with the present disclosure are not so limited and packaging material can include any suitable material. Suitable materials include, for example, polyethylene, polypropylene, polyvinylchloride, polyester, polyamide, polyvinylidenchloride, ethylenvinyl alcohol, among others.

The packaging material can be formed such that it can be vacuum sealed to enclose the cut of meat, adsorptive material, salt material, and wood paper therein to form the package. The package can be transported from a distributor and/or other provider to a final sales location. A final sales location, as used herein, can include a store that is selling to a consumer, such as a grocery store, a butcher, a restaurant, and/or a caterer, among other locations.

As an example, the distributor can cut a carcass into primal or subprimal cuts of meat. The primal or subprimal cuts of meat (e.g., within 24 hours to a few days) can have one or more packets (or the adsorptive material and salt material applied directly to the fat layer portion, as further described herein in connection with FIGS. 2A and 5) applied on the fat layer portion of the cut of meat, wood paper applied on the top of the one or more packets, and the cut of meat with the packet can be sealed to form the package. The distributor can transport packages of meat to final sales locations upon request by the final sales locations. Once a package reaches a final sales location, the cut of meat can be removed from the package and can be processed for sale to a consumer. For instance, the fat layer portion can be cut off and/or the cut of meat can be further processed (cut into smaller cuts, weighed, packaged, labeled, etc.)

Figure 2A:
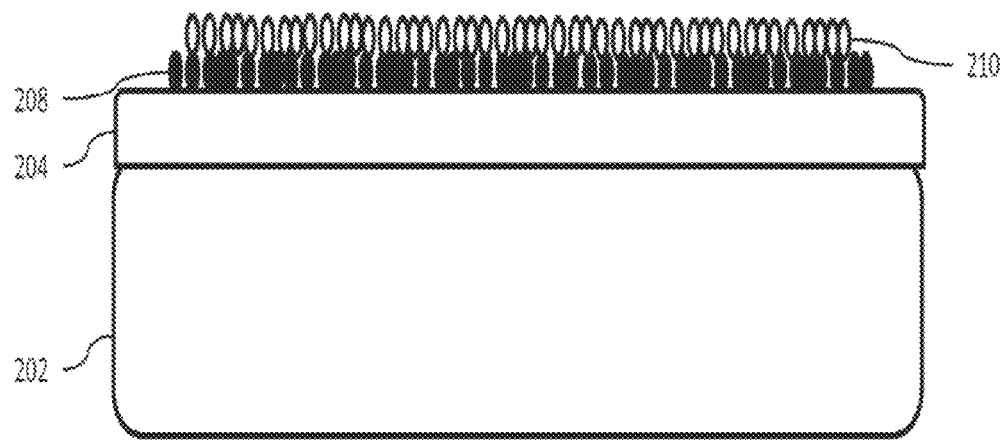
FIGS. 2A-2E illustrate examples of packaging including an adsorptive material, a salt, and wood paper in accordance with one or more embodiments of present disclosure.

FIGS. 2A-2E illustrate examples of packaging including an adsorptive material, a salt, and wood paper in accordance with one or more embodiments of present disclosure. The embodiment of FIG. 2A show cut of meat that has been prepared with aging materials thereon to be aged according to an embodiment of the present disclosure.

In FIG. 2A, the cut of meat has an edible meat portion 202 and a fat layer portion 204. In this embodiment, the adsorption material 208 is placed directly onto the outer surface of the fat layer 204. A salt material 210 is placed on the adsorption material 208.

Figure 2B:

FIG. 2B includes the same elements of FIG. 2A. However, FIG. 2B additionally includes a wood paper layer (can be of one or multiple pieces of wood paper) 214 placed on the salt material 210.

Figure 2C:
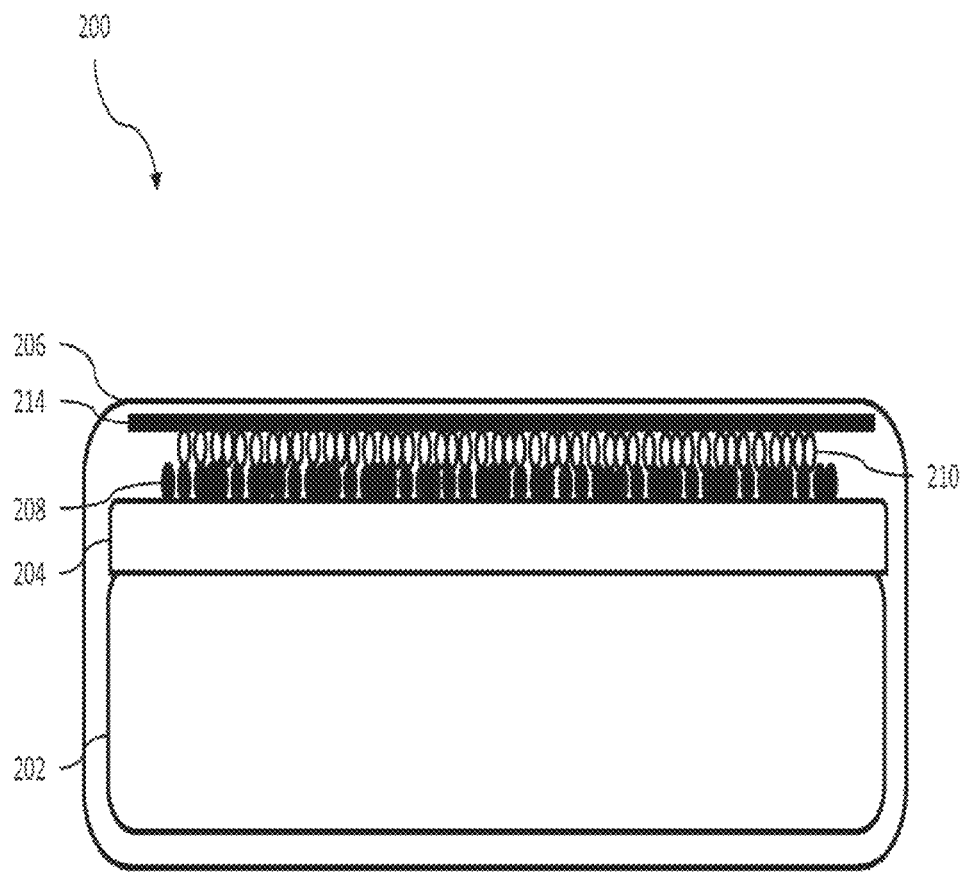

FIG. 2C includes the same elements of FIG. 2B. However, FIG. 2C additionally includes packaging material 206 that surrounds the edible meat portion 202 and a fat layer portion 204, and the aging materials: the adsorption material 208, the salt material 210, and the wood paper layer 214. In such embodiments, the package material 206 is sealed on all sides during the aging process such that gases and fluids cannot escape from the package 200.

Figure 2D:
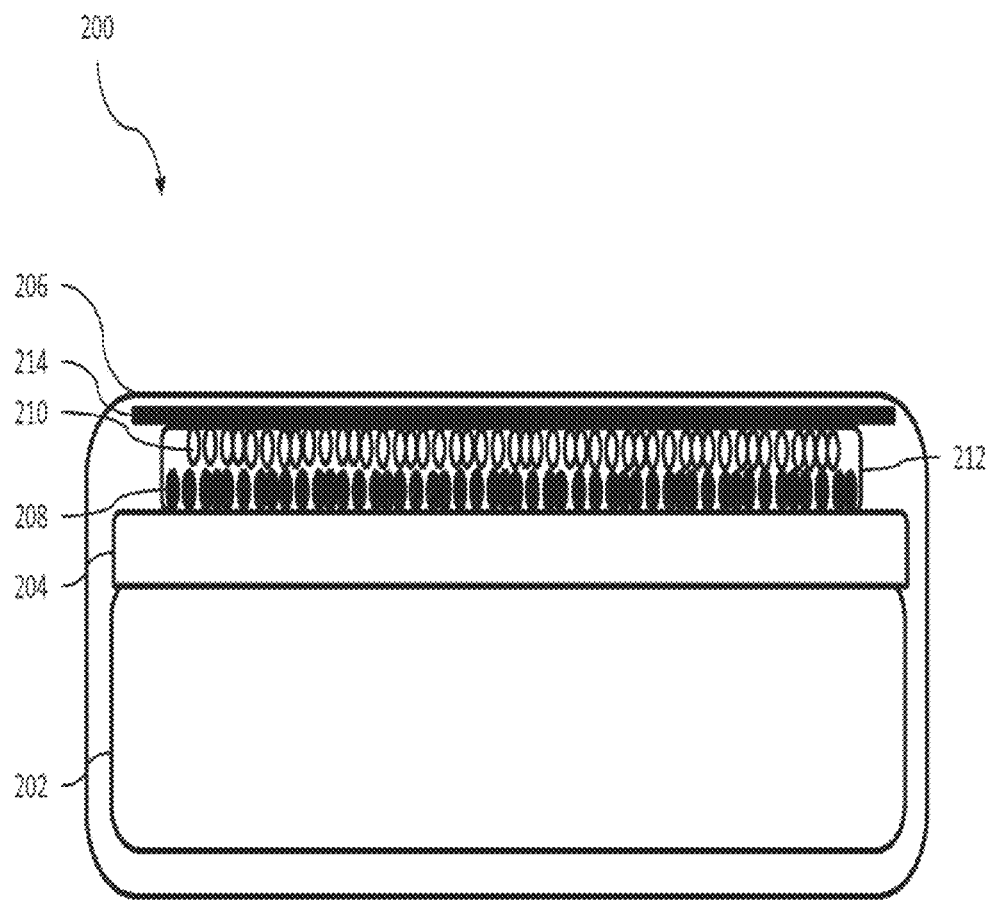

FIG. 2D includes the same elements of FIG. 2C. However, FIG. 2D additionally includes a packet 212 that contains both the adsorption material 208 and the salt material 210. In such an embodiment, the two materials may co-mingle within the packet 212. In such embodiments, the packet 212 is sealed on all sides such that the materials inside cannot fall out, however, the packet 212 is made from a gas/liquid permeable material and therefore, the materials 208 and 210 can interact with gases and liquids within the package 200.

Figure 2E:
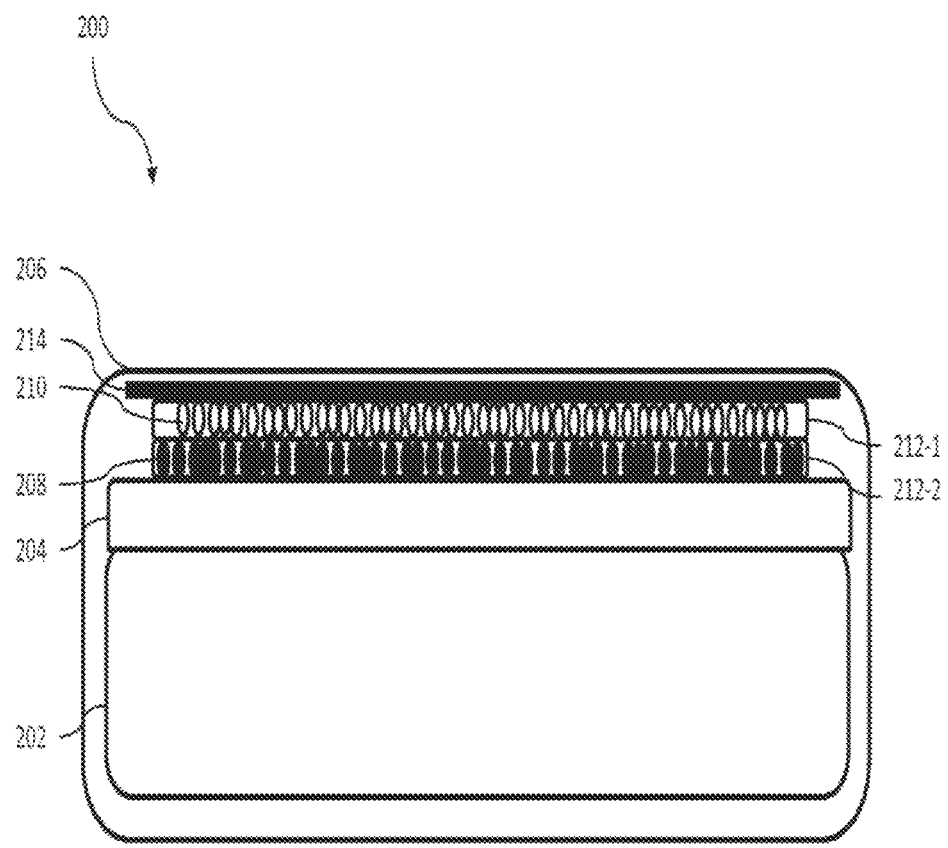

FIG. 2E includes the same elements of FIG. 2C. However, FIG. 2D additionally includes a first packet 212-1 that contains the salt material 210 and a second packet 212-2 that contains the adsorption material 208. In such an embodiment, the two materials will be separate from the other. In such embodiments, each packet is sealed on all sides such that the material inside cannot fall out, however, each packet is made from a gas/liquid permeable material and therefore, the materials 208 and 210 can interact with gases and liquids within the package 200.

Figure 3:
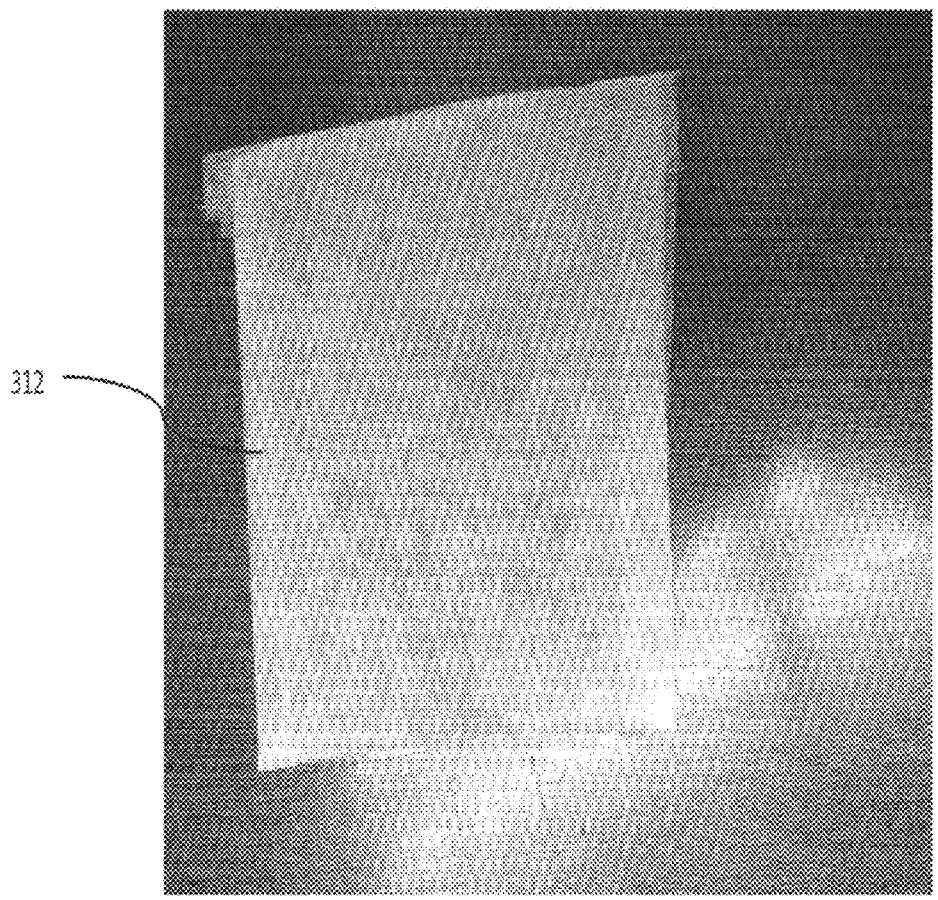
FIG. 3 illustrates an example of a packet containing an adsorptive material and a salt in accordance with one or more embodiments of present disclosure.

FIG. 3 illustrates an example of a packet containing an adsorptive material and a salt material in accordance with one or more embodiments of present disclosure. As previously discussed, the packet 312 can include a mixture of an adsorptive material and a salt material. The mixture can include an equal composition of the adsorptive material and the salt material.

The packet 312, in a number of embodiments, can be pre-scaled. That is, the amount of the adsorptive material and the salt material can include a pre-measured amount of the adsorptive material and the salt material.

By pre-scaling the packet 312, an appropriate amount of packets and/or wood paper can be applied on a cut of meat. For instance, a plurality of packets or larger packets of adsorption material and/or salt material can be applied on top of a fat layer portion of a cut of meat based a number of factors.

For example, some factors include the cut of meat, the type of meat (beef, lamb, etc.), length of aging desired, and/or weight of the cut of meat. For instance, a particular cut of meat can have two packets applied on the surface of the fat layer portion of the cut of meat based on the weight and a piece of wood paper can be applied on each of the two packets (for a total of two pieces of wood paper).

In various embodiments, different cuts of meat may have a different amount of the adsorptive material/salt material applied. For instance, a package for a strip steak may include a volume of 99.6 percent of meat, 0.17 percent of adsorptive material, and 0.17 percent of salt material.

By contrast, a package for ribs, which have a higher surface area than the strip steak, may include a volume of 99.43 percent of meat, 0.29 percent of adsorptive material, and 0.29 percent of salt material. Although embodiments in accordance with the present disclosure are not limited to the particular volume values, the values are provided for illustrative purposes only and embodiments in accordance with the present disclosure can include any suitable volume values.

One possible benefit of using embodiments having a packet is that by using a packet that contains the adsorptive material and the salt material, as compared to applying the adsorptive material and salt material to the fat layer portion (e.g., discussed further in connection with FIG. 5), a provider of the meat may not have to declare the contents of the packet to consumers. For instance, as the adsorptive material and salt material are contained in the packet 312, the materials do not contact the cut of meat. As such, the adsorptive material and salt material can be removed prior to reaching the consumer(s) that may consume the meat.

Figure 4:
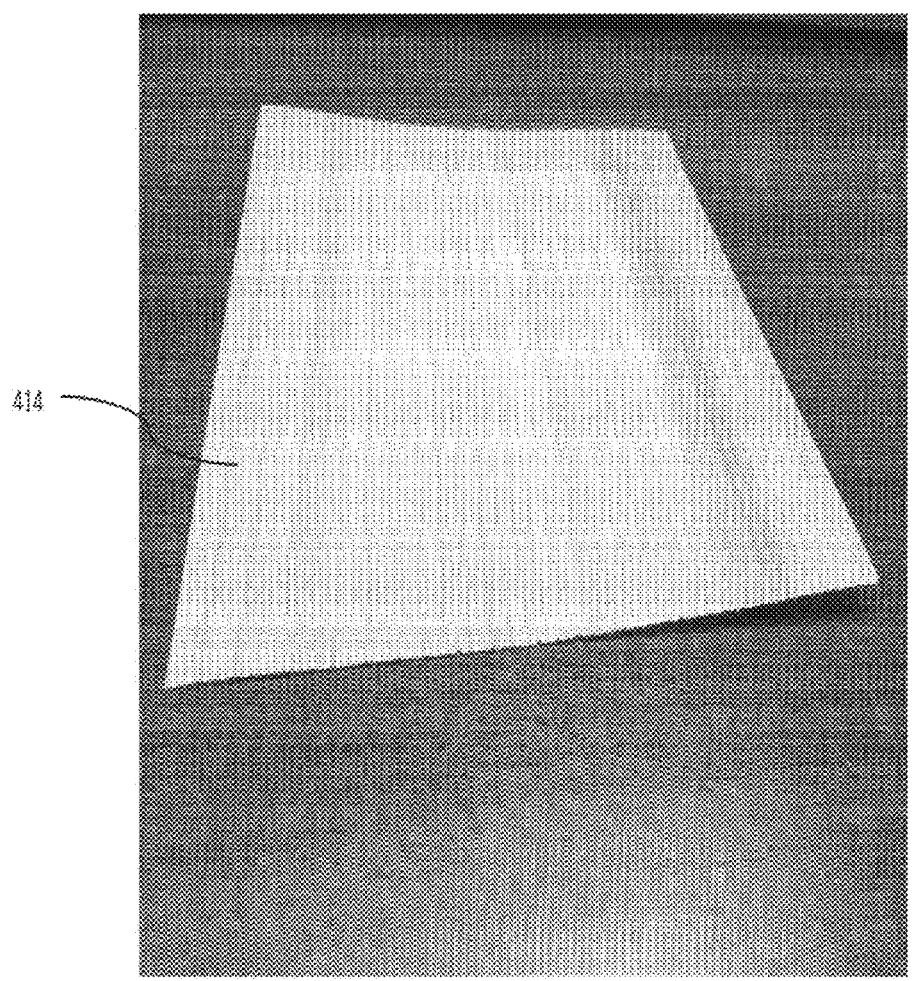
FIG. 4 an example of a piece of wood paper in accordance with one or more embodiments of present disclosure.

FIG. 4 an example of a piece of wood paper in accordance with one or more embodiments of present disclosure. As previously discussed, the piece of wood paper 414 can be applied on one or more of the packets that are applied to the fat layer portion of the meat.

The piece of wood paper 414 can, for example, hold the packet in place, can act as an aromatic, and/or can act as a desiccant. As used herein, an "aromatic" is a material that is added to the package or aging materials to enhance the natural flavors within a cut of meat. As used herein, the term "desiccant" refers to a material that absorbs water.

Figure 5:
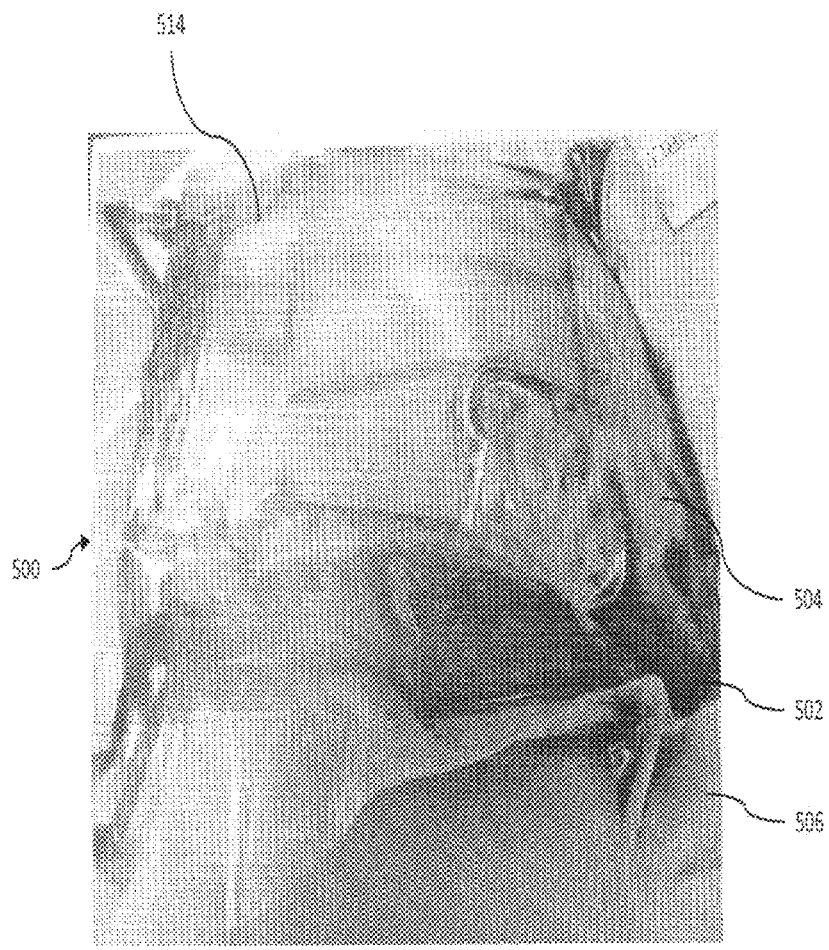
FIG. 5 illustrates an example of a package for wet aging meat having adsorptive material, salt, and wood paper placed therein in accordance with one or more embodiments of the present disclosure.

FIG. 5 illustrates an example of a package for wet aging meat in accordance with one or more embodiments of the present disclosure. In various embodiments, the adsorptive material can be applied directly to the fat layer portion 504 of the cut of meat. In such embodiments, the salt material can be applied on the adsorptive material. The fat layer portion 504 can, for instance, prevent the adsorptive material and the salt material from directly contacting the edible meat portion 502 of the cut of meat. And, as previously discussed, in some embodiments, one or more pieces of wood paper 514 can be applied on the adsorptive material and the salt material. In the embodiment shown in FIG. 5, the adsorptive material and the salt material are positioned under the wood paper 514, such that they cannot be seen in the figure. In various embodiments, the adsorptive material can be located on the fat layer portion 504 of the cut of meat, the salt material can be located on the adsorptive material, and/or the piece of wood paper can located on the salt material.

The cut of meat (i.e., the edible meat portion 502 and the fat layer portion 504) with the adsorptive material and the salt material, and in some embodiments the wood paper 514, can be hermetically sealed in packaging material 506 to form a package, such as the package 500 shown in FIG. 5. Hermetically sealed, in some embodiments, can include vacuum sealing the meat with the adsorptive material, salt material, and wood paper in a packaging material.

The package 500 formed, as illustrated by FIGS. 1 and 5, can be stored for a period of time. For instance, the storage can include leaving the cut of meat with the adsorptive material, salt material (e.g., one or more packets), and/or one or more pieces of wood paper sealed in the packaging material 506 for the period of time. An example period of time can include 7-30 days. If properly maintained at a suitable temperature (e.g., 33 degrees Fahrenheit) meat can wet age while sealed in the packaging material 506.

By wet aging the meat in a package 500 that includes the cut of meat sealed with an adsorptive material, salt material, and/or wood paper, the meat can age in a shorter amount of time, in a smaller area, and with less shrinkage than dry aging processes. Wet aging in the package, in accordance with the present disclosure, can result in shrinkage of 2 percent of weight or less of the meat, in some embodiments. Further, the meat can wet age during transportation of the meat from distributor to a final sales location (e.g., a store) as the various aging materials are held in position by the packing material.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for wet aging a cut of meat having a fat layer portion and an edible meat portion, wherein the fat layer portion comprises naturally occurring fat on the edible meat portion the method comprising:
    (a) placing an adsorptive material only on the fat layer portion of the meat;
    (b) placing a salt material on the adsorptive material or on the fat layer portion with the adsorptive material, wherein the adsorptive material and salt material are not placed on the edible meat portion;
    (c) placing the cut of meat with the adsorptive material and salt material into a packaging material;
    (d) hermetically sealing the packaging material containing the cut of meat to form a package; and
    (e) allowing the cut of meat to wet age for about at least 7 days,
    wherein the adsorptive material comprises activated charcoal; and
    wherein moisture in the edible meat portion of the cut of meat is pulled by the salt material through pores in the fat layer portion to age the cut of meat; and
    wherein the moisture is held in place inside the fat layer portion.

2. The method of claim 1, wherein the cut of meat is a primal or subprimal cut.

3. The method of claim 1, wherein the adsorptive material includes a mixture of activated charcoal and sea salt.

4. The method of claim 1, wherein the salt material is a salt smoked with alder wood.

5. The method of claim 3, wherein the adsorptive material and the salt material form a 50/50 mixture.

6. The method of claim 1, further including a step of placing one or more pieces of wood paper on at least one of the adsorptive material and the salt material.

7. The method of claim 6, wherein the adsorptive material is located on the fat layer portion of the cut of meat, the salt material is located on the adsorptive material, and the one or more pieces of wood paper are located on the salt material.

8. The method of claim 6, including storing the cut of meat with the adsorptive material and the salt material and the one or more pieces of wood paper sealed in the packaging material for 7 to 30 days.

* * * * *